United States Patent

[11] 3,628,947

[72] Inventor Fred D. DeVaney
 Duluth, Minn.
[21] Appl. No. 787,209
[22] Filed Dec. 26, 1968
[45] Patented Dec. 21, 1971
[73] Assignee The Shenango Furnace Company
 Continuation-in-part of application Ser. No. 666,541, Aug. 24, 1968, now abandoned. This application Dec. 26, 1968, Ser. No. 787,209

[54] AGGLOMERATE OF IRON ORE
 1 Claim, No Drawings

[52] U.S. Cl. .................................................. 75/3
[51] Int. Cl. .................................................. C21b 1/24
[50] Field of Search .................................... 75/1, 3-5

[56] References Cited
UNITED STATES PATENTS

| | | | |
|---|---|---|---|
| 2,336,618 | 12/1943 | Jones .......................... | 75/3 |
| 2,789,894 | 4/1957 | DeVaney ....................... | 75/3 |
| 3,053,648 | 9/1962 | Stephens, Jr. et al. ........ | 75/3 X |
| 3,097,945 | 7/1963 | Paris et al. .................. | 75/3 |
| 3,254,985 | 6/1966 | Merklin ....................... | 75/3 |
| 3,323,901 | 6/1967 | Dahl et al. ................... | 75/3 |
| 3,420,453 | 1/1969 | Tada et al. ................... | 75/3 X |
| 3,314,780 | 4/1967 | Holowaty et al. ............. | 75/3 |

*Primary Examiner*—Allen B. Curtis
*Attorney*—Pierce, Scheffler & Parker

ABSTRACT: A binder for use in agglomerating finely divided iron ore materials, e.g., concentrates, is prepared from an iron-bearing material known on the Mesabi Range of Minnesota as "paint rock." This is a red or orange, fairly soft and extremely sticky mineral consisting essentially of hematite, kaolinite and quartz, and having a high-ignition loss and high-moisture content. This naturally occurring material is dried—to a moisture content of about 6 percent or lower—at a temperature too low to drive off combined water; and ground to about 200 mesh. The ground dry paint rock is added to and thoroughly mixed with moist iron ore fines (e.g., to moist filtercake of iron ore concentrate), and the mixture is thereafter fed to any conventional balling device where it is rolled into small "pellets" preliminary to being indurated.

The present invention relates to the art of beneficiating ore materials, particularly iron ore materials, and is concerned with improvements in pelletizing ore material fines, particularly iron ore concentrates.

AGGLOMERATE OF IRON ORE

This application is a continuation-in-part of application Ser. No. 666,541 filed Aug. 24, 1968, now abandoned.

The present invention relates to the art of beneficiating ore materials, particularly iron ore materials, and is concerned with improvements in pelletizing ore material fines, particularly iron ore concentrates.

Pelletizing of iron ore is a relatively recent development but since the first commercial plants were built in 1948, the industry has grown by leaps and bounds. In the year 1967 the production of pellets had grown in North America alone to approximately 56,000,000 long tons. The process has been so widely accepted because it made possible the agglomeration of fine concentrates which could not be efficiently agglomerated by any of the known methods such as sintering or nodulizing. The acceptance of the process was also accelerated by the fact that because pellets were high in iron content, uniform in grade and size and readily reducible, their use made it possible to drastically increase the capacity of an iron blast furnace and also to decrease the amount of coke and flux required.

The development of successful pelletizing processes was not an easy one and required years of work by many research laboratories and the expenditure of many millions of dollars. Without exception the best way to make pellets has been to take the filtered fine iron concentrates or ground wetted iron ore and roll it into balls prior to indurating. The proper amount of moisture to make a good strong ball that would stand the considerable amount of conveying and mechanical handling incidental to the indurating process varies with the mineralogical composition and the size consist of the mixture. The amount of surface area of the ground material is of particular importance. The proper amount of moisture to render the material ballable, sufficiently plastic so the balls will deform slightly rather than break in handling, and also sufficiently strong to withstand a moderate load without breaking, varies with this surface area. For example, with a heavy, relatively coarse mineral like magnetite ground to 65 mesh, the optimum moisture content may be as low as 8 percent. With a fine, low density material such as a cement mix, the optimum moisture may be as high as 25 percent. For most iron ore concentrates the optimum moisture range is between 8.5 and 10.5 percent. The actual balling operation may be carried on in a variety of production machines such as balling drums, balling cones or balling discs.

The formed and closely sized damp balls may then be indurated by a variety of pelletizing methods. Furnaces now in general use consist of three general types. These are:

1. The vertical shaft furnace;
2. The continuous grate machine;
3. The third type of machine is the so-called grate-kiln machine.

One of the problems that troubled all early investigators of pelletizing, irrespective of the type of furnace used, was that the moist green balls, while fairly strong in the moist stage, became quite weak structurally during the early stages of heating and broke due to the mechanical stresses imposed by static loading or by handling. However, a much more serious problem was the explosion or exfoliation of the balls during the initial induration stage when the moisture was being driven from the balls. The rate of heating during the induration stages may be extremely rapid—approaching 200° F. per minute—and because the balls are normally weak as the moisture is driven off, many balls actually exploded during the initial heating stage and were reduced to dust. The pelletizing process would never have attained success unless a solution to this problem was solved.

The solution to this problem was the finding of additives which would make the green balls more plastic and more easily handled without breakage prior to firing and which gave the balls an added bond during induration so that they would not exfoliate or explode prior to the time when they acquired a high strength at temperatures in the 2300° to 2600° F. range, through either grain growth or slag bonding.

Prior to 1951 two types of additives were found that solved difficulties. The first additive successfully used was starch at the pilot plant of Erie Mining Co. at Aurora, Minnesota in 1950 and this proved to be a major advance in the art. However, because the price of starch was about 7 per pound and 3 pounds were required per ton of the concentrates, a search for a cheaper additive was instituted. Later in 1950 at the same plant, bentonite was found to be a cheaper and more effective additive. The use of both starch and bentonite were developed and patented by the applicant. The use of starch is described in U.S. Pat. No. 2,595,132, May 13, 1952. The use of bentonite is described in U.S. Pat. No. 2,743,172, Apr. 24, 1956. The effectiveness of bentonite and the readiness with which the pelletizing industry has accepted its use may be judged from the fact that in 1966 some 500,000 tons of ground bentonite was used in North American plants pelletizing iron ores.

While the use of bentonite has proved to be a success in the pelletizing of iron ore, it nevertheless has some drawbacks. Bentonite usually contains about 55 percent silica, and when added to iron concentrate in the usual amounts of from 15 to 10 lbs. per ton of the concentrates, it raises the silica content of the resultant pellets by about 0.35 percent silica. This is undesirable, because silica is the chief impurity which the concentration process is devised to eliminate. Its inclusion in the pellet definitely lowers the value of the pellet. Bentonite contains practically no iron; hence it acts as a diluent that detracts from the value of the finished product. Another disadvantage is that no bentonite of commercial value occurs near the Lake Superior iron districts with the result that bentonite has to be shipped long distances from its nearest sources, i.e. either from the Black Hills area of South Dakota or adjoining areas in Wyoming. The rail haul to the Lake Superior pellet plants is therefore from 700 to 1000 miles, resulting in high freight rates in the order of about $10.00 per short ton. This freight rate is as high or higher than the cost of the prepared bentonite at its shipping point.

The search therefore has continued for an additive that could be obtained closer to the large pellet plants in the Lake Superior area and thus reduce freight costs and for one that would not materially increase the percentage of silica in the pellets. A substitute meeting these requirements and one which will also result in substantial savings to the operator of a pelletizing plant has now been found. The material is a particular type of iron-bearing material, or "ore," consisting of iron oxide and kaolinite, with or without quartz, the iron oxide content of which is very fine grained and which is high in alumina content and which may—and usually doe—have a high content of moisture in its natural state. Included in this definition is a material occurring on the Mesabi Range of Minnesota, United States of America and which is known as "paint rock." The material is found also in other areas, such as the Labrador Trough, and is known by other names as well.

PAINT ROCK

Paint rock is the name given to an iron-rich material in the Biwabik Iron Formation on the Mesabi Range of Minnesota that has been found through the oxidation and enrichment of the original slaty members. A number of paint rock zones may occur in a cross section of the iron formation but the main zone occurs as an oxidation remnant of the intermediate slate which occurs as the lower geological member in the Lower Slaty formation. The Lower Cherty formation lies directly below it.

Paint rock, as the name indicates, is a red or orange, fairly soft, extremely sticky material. Mineralogically, it consists mainly of hematite, kaolinite and quartz. A typical analysis of paint rock is that of a material from the Whiteside Mine of the Snyder Mining Company near Buhl, Minnesota. An analysis of this material on a dry basis is as follows:

| | |
|---|---|
| Iron | 51.40 |
| Phosphorus | .112 |
| Silica | 8.0 |
| Manganese | .04 |
| Alumina | 7.18 |
| Loss by ignition | 10.0 |
| Moisture | 19.7 |

Mineralogically, the above sample consists approximately of 75 percent hematite, 20 percent kaolinite and 5 percent quartz. Other operable paint rocks may have varying amounts of these three constituents, the hematite ranging from 60 to as much as 80 percent and the kaolinite ranging from 15 to 35 percent. For the present purpose, the paint rock with the highest kaolinite (and the lowest quartz) content is the most desirable. Its mineral particles are exceedingly fine since they are derived from the alteration of slates. The extreme stickiness or adhesiveness of the paint rock is undoubtedly due to its large content of kaolinite (the common name for clay), and to the extremely fine grain sizes of the hematite and the kaolinite. The average Blaine number of paint rock, ground to 94 percent 200 mesh Tayler, is 9,900 sq. cm. per gram, (or, about 10,900 when ground to 98 percent minus 200 mesh)—more broadly, within the range 8,000–11,000—, which compares with an average Blaine number of 3,180 for bentonite ground to 85.2 percent minus 200 mesh Tyler and an average Blaine number of 1600–2100 for a taconite concentrate 85–95 percent by weight of which is minus 325 mesh Tyler. This rock, because of its origin, is particularly fine-grained and thus particularly effective as an additive.

Reference: Gruner, J. W., Mineralogy and Geology of the Mesabi Range; Minnesota Geological Survey, 1946.

The paint rock on grinding, and later dispersion in water, breaks down to an exceedingly fine sticky claylike material. The adhesivelike properties of this material have been known for many years and there has been some consideration for its use as an additive in pelletizing. Some attempts along this line have been made in the past but without success and have been abandoned. It has only been recently that more detailed study has shown that this material can be an effective binder, but only when it has been prepared and used under carefully controlled conditions. The preparation of the paint rock and its method of application constitute this invention.

Earlier attempts to use paint rock failed because of the inability to satisfactorily wet grind and filter the paint rock. Other attempts to use coarser ground material likewise failed because of the relatively small amount of new surface produced to act as a binder. Attempts at dry grinding also failed probably because of improper drying and grinding.

I have found that the steps of drying and grinding are all of major importance and if either step is not carried out in the manner which constitutes this invention the additive will be ineffective.

I have found that the first step in the preparation of the paint rock, after mining and coarse crushing to about 4 inches, is the drying operation which must be done carefully. It may be noted that in the typical analysis of paint rock given hereinbefore, the material is high in moisture (19.7 percent) and also has a high "Loss on Ignition" (10 percent). This Loss on Ignition is almost entirely made up of the chemically combined water, either as water of crystallization or as the hydroxyl molecule present in the hydrous minerals in the paint rock, the principal one of which is kaolinite. I discovered that not only is it desirable to dry this paint rock so that the amount of moisture is reduced to below 6 percent but also that in so doing it is imperative that none of the paint rock be subjected to a temperature at which the combined water will be driven off. If any part of this ore material is heated above the temperature at which combined water is driven off, e.g., as high as about 1500° F., the nature of the mineral is changed. If such dehydrated mineral is brought again in contact with water, it will not retake water but will remain inert plastically and will be useless as a binder.

Mention has been made that the moisture should be reduced to below 6 percent. The absolute figure will vary with the type of paint rock used. It is, of course, necessary that the ground material be not sticky so that it will not hang up in bins or conveyor pipes. Overdrying beyond this simply means additional expense. However, drying of some types of paint rock down to 1 or 2 percent moisture may be necessary to secure efficient fine grinding and the avoidance of caking in grinding mills, pipes and storage bins. As a matter of practicality, I prefer drying in two stages—the first stage to be carried out in a rotary dryer with careful temperature controls. The second step combines the fine grinding down to 200 mesh stage with the final drying operation in a hot air-swept ball mill or equivalent grinding device.

The customary method of adding additives to a fine iron concentrate is to meter the dry additive and the filtered concentrate and send them to a mixing device such as a mixer-muller. Here the two are mixed and in some plants any additional water required for balling is added. The mixture then goes to a balling device such as a balling drum or disc. The retention time in either device is very short. Even with a balling drum with a circulating load of 200 percent the total elapsed time from the mixing of the additive with the concentrate to the charging of the balls into the furnace is only about 4 minutes. This is an extremely short time for any dry additive to absorb its full complement of moisture, either from the damp concentrate or from the small amount of added water. I have found that with both bentonite and paint rock a substantial gain in the utilization of the resulting product can be secured if the dry additive is mixed with the moist concentrate in the described manner and then, prior to balling, held ("stored") for a time sufficient to permit the additive to absorb its full complement of water. During this storage period the additive takes up its full complement of water and achieves its maximum plasticity and binding power. Another advantage occurs in that a much more uniform feed as to size consist, chemical and moisture content is produced, which results in better and more uniform pellets. While this storage is helpful in the case of paint rock—just as in the case of bentonite—it is not essential to the successful use of the material as a binder.

One of the main advantages of using paint rock is that the paint rock has a substantial iron content. When added to taconite (or other oxidic iron ore) concentrates to be pelletized, a substantial gain in the total tonnage of pellets results with little change in the grade of the product. Because the paint rock contains only from 6 to 10 percent $SiO_2$ there is no marked increase in the silica content of the pellet as obtains in the case of bentonite which contains from 50 to 60 percent silica.

A better understanding of the value of paint rock as an additive can be obtained through an actual example of its use.

EXAMPLE NO. 1

In this example the starting concentrate was a high-grade magnetite concentrate from an Ontario property just north of Lake Superior. To this dried concentrate was added 4 percent dry weight of paint rock ore dried and ground in the manner just described. These two materials together with an amount of water were mixed and mulled together and stored over night (eight or more hours) prior to balling. Similarly, a like amount of the same concentrate was mixed with 0.5 percent of a good quality swellingtype Black Hills bentonite, stored and balled in the same manner. After balling to two types of pellets were fired together in the same pelletizing pot separated only by a divider so that the firing conditions were identical. A summary of this test is shown on the attached table 1. In each case, the particle size of the additive (paint rock; bentonite) was about 95 percent minus 200 mesh Tyler.

TABLE NO. I.—PAINT ROCK VS. BENTONITE

Additive in Pelletizing Ontario Magnetite

| Binder | Moisture, percent | Compressive strength (lbs.) | | 12-inch drops | Decrepitation,° C., 100% survival |
|---|---|---|---|---|---|
| | | Wet | Dry | | |
| 4% Paint Rock | 7.8 | 2.6 | 3.4 | 5.3 | 555 |
| 0.5% Bentonite | 8.8 | 4.3 | 7.0 | 8.5 | 540 |
| No additive* | 8.0 | 2.0 | 1.0 | 5.3 | 405 |

Results of Firing Tests

| Binder | Compressive strength, lb. | | | Sizing analysis of tumbled pellets, percent wt. | | |
|---|---|---|---|---|---|---|
| | Avg. | Max. | Min. | +¼" | −¼"+28M | −28M |
| 4% Paint Rock | 537 | 1,050 | 180 | 82.1 | 15.9 | 2.0 |
| 0.5% Bentonite | 337 | 750 | 160 | 60.1 | 36.2 | 3.7 |

*Concentrates and water mixed and mulled as in other tests but balled immediately.

Additive Paint Rock
[Analysis and weight of materials and products]

| Material | Wt. percent (dry) | Percent | | | |
|---|---|---|---|---|---|
| | | Fe | Phos. | Mang. | Silica |
| Starting Ontario conct. | 100.00 | 69.61 | .009 | 0.12 | 2.50 |
| Paint Rock | 4.00 | 51.40 | .118 | 0.91 | 8.00 |
| Resulting pellets | 106.80 | 67.03 | .013 | 0.15 | 2.63 |

Additive Bentonite
[Analysis and weight of materials and products]

| Material | Wt. percent (dry) | Percent | | | |
|---|---|---|---|---|---|
| | | Fe | Phos. | Mang. | Silica |
| Starting Ontario conct. | 100.00 | 69.61 | .009 | 0.12 | 2.50 |
| Bentonite | 0.50 | | | | 55.00 |
| Resulting pellets | 103.65 | 67.09 | .009 | 0.12 | 2.63 |

For the purpose of comparison, the characteristics of balls made with no additive are also shown. It will be seen that the balls with the paint rock additive definitely have both a higher dry and wet strength than do the balls with no additive. The wet and dry strength of balls with bentonite is higher than those with paint rock; however, the compressive strength of the balls with paint rock is high enough to meet industrial standards and hence is satisfactory.

As mentioned in a previous paragraph one of the main purposes of using an additive in pelletizing is to prevent exfoliation or decrepitation. The test data shows that the balls with paint rock are somewhat superior to those made with bentonite and much superior to those with no additive. The fired pellets were subject to standard compressive tests and also to standard tumble tests to measure their quality. In the tumble test fired pellets are placed in a drum, fitted with lifters, and rotated. At the end of a definite number of revolutions the pellets are removed and screened. The strength of pellets is measured by the amounts of degradation that takes place. An inspection of this table shows that the average fired strength of pellets made with paint rock was over 50 percent greater than those made with bentonite. This improved quality of the pellets is also evidenced by the fact that after the tumble test 82.1 percent of the pellets with paint rock remained coarser than one-fourth inches whereas only 60.1 percent of the pellets made with bentonite were coarser than this size. This is additional proof that the pellets made with paint rock were definitely stronger than those made with bentonite. A comparison of the analysis of the starting materials and for the finished pellets for the described test, together with the weight recovery of the pellets is also shown. It should be noted that in the pelletizing process the magnetite ($Fe_3O_4$) in the concentrate is oxidized to hematite ($Fe_2O_3$) with a gain in weight. For example, if pellets were made of pure magnetite (72.3 percent iron) and were converted entirely to hematite (70.0 percent iron) there would be a gain in weight of 3.2 percent. A comparison of the two types of pellets shows that the analyses of the two types of pellets are almost identical but because of the greater weight of paint rock added, the weight of these fired pellets, taking 100 as the starting weight of dry concentrates in each example, is 106.80 as compared to 103.65. This is a gain in weight of 3.15 percent. This additional tonnage represents considerable added revenue. A detailed analysis of the economics involved has shown that if paint rock is substituted in place of bentonite as the additive, a saving of about 25 per ton of starting concentrates can be made. This comes about mainly because paint rock is relatively cheap and because its iron units have appreciable worth.

EXAMPLE NO. 2

The concentrates reported in Example No. 1 were fine in size and of very high grade. The following concerns a second test with a Mesabi taconite concentrate closer to the grade and structure currently being shipped in vast amounts. This concentrate was about 88 percent finer than 325 mesh and had an analysis of:

Mesabi taconite concentrate:
Iron _____ 65.50
Phosphorus _____ .009
Manganese _____ 0.25
Silica _____ 7.30

This test was made on a considerably larger scale than the one detailed in example No. 1. A sample of filtercake containing 9.5 percent moisture was taken directly from the mill filter and to this was added 3 percent by weight of dried, −200 mesh ground, paint rock obtained from the Whiteside Mine at Buhl, Minnesota. The mixture was thoroughly mixed by passage over a mixing-mulling device. It was then placed in drums and allowed to stand overnight to give ample opportunity for the mixture to become homogeneous relative to moisture. It should be noted that the moisture of production mill concentrate contains somewhat more moisture (9.5 percent) than did the sample treated in example No. 1 (7.8 percent). This is typical of the spread in moisture content between balls rolled in a production plant as contrasted to those made starting with dry concentrate in a laboratory. The 9.5 percent moisture was sufficient so that the moisture-accepting capacity of the paint rock was completely satisfied. On the day following the mixing of the material, it was balled in a 4-ft. balling disc. The resulting balls were then fired in a pot grate furnace having a capacity of 1 cubic ft. A top temperature of 2550° F. was achieved in this furnace. The fired pellets after discharge from the furnace were chemically analyzed and checked for quality by standard compression and tumble tests. A number of firing tests were made to determine the optimum firing cycle. It was found that the following cycle gave excellent results with no decrepitation or exfoliation.

a. Updraft Drying pass at 850° F. for 5 minutes, using 300 S.C.F.M./$Ft^2$ of hearth area;
b. A Downdraft Drying pass at 7000° F. for 2 minutes, 200 S.C.F.M./$Ft^{2c}$;
c. A preheat pass at 1800° F. for 4 minutes;
d. Firing at 2375° F. for approximately 15 minutes.

Tests made on a representative sample of green balls showed them to have an average wet strength of 3.0 lbs. and an average dried strength of 3.8 lbs. The average ball could be dropped 8 times from height of 12 inches before breaking. Tests on the fired balls showed an average compressive strength of 515 pounds. A standard 25-lb. 200-revolution tumbler test showed 94.5 percent of the tumbled product coarser than 3 mesh. These tests showed the product to be of excellent quality and the equal of pellets made with bentonite.

The additive developed is particularly valuable if used in the Lake Superior District in the pelletizing of the specular hematite ore of Michigan and the magnetite concentrates of Michigan, Minnesota and Western Ontario. These areas are close to the supply of paint rock from the Mesabi area. Paint rock is relatively cheap as it is now in little demand. It is also relatively close to the above-mentioned districts and freight costs will be relatively low.

EXAMPLE NO. 3

Test work in Example No. 1 was done on a very fine concentrate, having a sizing analysis of 97.4 percent finer than 325 mesh. It was thought this sample was considerably finer than the average Mesabi taconite concentrate, and that it was essential to test paint rock on the latter—somewhat coarser—product. A magnetic taconite concentrate from the Reserve Mining Company's operation at Silver Bay, Minnesota was obtained, the same analyzing 89.2 percent finer than 325 mesh.

Test material was prepared in essentially the same manner as in example No. 1 above, in that both the bentonite-containing and the paint rock-containing mixtures were stored over night before being balled and thereafter fired. The balled products were evaluated. It was found that with this coarser concentrate the paint rock showed an even greater improvement in preventing decrepitation than in the case of the finer concentrate of example No. 1. With paint rock, 100 percent of the pellets survived at 750° C. heating period, whereas the bentonite sample could only be heated to 510° C. before decrepitation took place.

EXAMPLE NO. 4

A continuous balling and pelletizing test was made using a grate-kiln machine at the Allis-Chalmers Laboratory near Milwaukee, Wisconsin, U.S.A. The starting material was a magnetite cone, from the Western Masabi Range, analyzing (in percentages by weight)
67.36% iron and
4.10% silica
and containing 85.7 percent by weight of particles finer than 325 mesh Tyler. These tests were made at the rate of approximately 1 ton concentrate per hour, and the total test period extended for a continuous period of about 2.5 days. During this period various additions were used. In the first test, 0.7 percent by weight of bentonite was added to the damp concentrate. The material was balled on a balling disc. The moisture content of the balled material was 9.5 percent by weight. The balls as formed were fed to a continuous grate-kiln machine wherein the balls were dried and then indurated to a top temperature of about 2425° F.

Thereafter, and under identical conditions of operation, 4.0 percent by weight of paint rock was substituted for the bentonite of the beginning test. Balling and firing conditions were identical.

The respective products from these two test compared as follows:

TABLE II

| Phase | A | B |
| --- | --- | --- |
| Indurated Product Bulk Density (lb./ft.³) | 132.5 | 133.0 |
| Indurated Product Strength (lb.) (compression) | 700 | 700 |
| Tumble Index (% On 3M) | 95.88 | 96.24 |
| Abrasion Study (% On 28M) | 96.24 | 96.56 |
| Preheat Strength (lb.) (compression) after grate before kiln | 217 | 337 |
| Balling Pan Feed Rate (lb./hr.) | 1930 | 2000 |
| Balling Pan Feed Moisture (%) | 8.8 | 9.6 |
| Green Ball Moisture (%) | 9.5 | 10.2 |
| Green Ball Strengths (compression) (lb.) Wet | 2.7 | 2.5 |
| Dry | 12.4 | 8.2 |
| 18" Drops | 8.8 | 7.3 |

These data show that the quality of the fired pellets made with paint rock is as higher as, or higher than, that of the fired pellets made with bentonite. The compression strength of the partially fired pellets ("preheat" stage) is 50 percent higher than those made from bentonite. The wet and dry, green ball strengths are slightly higher when bentonite is used as compared to paint rock, but the values for paint rock are well above acceptable limits. The figure for "18 inches drops" indicates the number of times a green ball can be dropped, from a height of 18 inches, before it breaks. Both values are well above acceptable limits.

The respective chemical analyses of the two indurated products compared as shown in table III following:

TABLE III

| Element | A | B |
| --- | --- | --- |
| Fe — total | 65.82 | 65.90 |
| Fe⁺⁺ | 0.19 | 0.23 |
| SiO₂ | 4.55 | 4.45 |
| Al₂O₃ | 0.37 | 0.52 |
| Mn | 0.12 | 0.12 |
| P | 0.012 | 0.016 |

The gain in weight, in the case of pellets made with paint rock, was about 3.5 percent, and in addition the iron content was higher and silica content was lower. The time for mixing the addition with the damp concentrate was essentially the same in both tests, and was of short duration. The total elapsed time from the point of addition of additive to concentrate to the point of feeding to the grate furnace did not exceed 5 minutes in either case.

Test work has shown that paint rock as an additive is particularly useful in pelletizing the specular hematite ore of Michigan. These ores are treated by flotation after a desliming operation. The resulting concentrates are therefore low in colloids which makes balling difficult unless much grinding is done to reduce the size of the flotation concentrates. Paint rock has an advantage over bentonite as an additive because of the greater weight used which increases the percentage of colloids in the mix.

The amount of paint rock necessary as an additive will, of course, depend on the physical characteristics of the paint rock used and also on the nature of the iron ore concentrates with which it is mixed. With some ores an amount of paint rock as low as 1 percent by weight may be sufficient as an additive. For most taconite concentrates an amount of from 2.5 to 5 percent seems indicated. In areas where paint rock can be produced close to a taconite plant, such as in areas of the Central Mesabi Range, it may prove economical to use amounts up to 10 percent, not because this amount is needed as an additive but because it permits cheap paint rock iron units to be converted to more valuable pellet iron units.

We claim:

1. An agglomerate consisting essentially of iron ore particles and a binder bonding said particles together, said binder consisting essentially of an oxidic iron ore material consisting mainly of hematite, kaolinite and quartz, substantially all of which binder passes a 200 mesh screen Tyler and exhibits a fineness corresponding to Blaine 8000–11,000 cm.²/gram., and in which the surface moisture content is from 1 to 6 percent by weight and the loss on ignition is of the order of 10 percent by weight.

\* \* \* \* \*